A. T. WALL.
PIN COMPONENTS AND METHOD OF MAKING THE SAME.
APPLICATION FILED APR. 28, 1920.
1,378,501. Patented May 17, 1921.
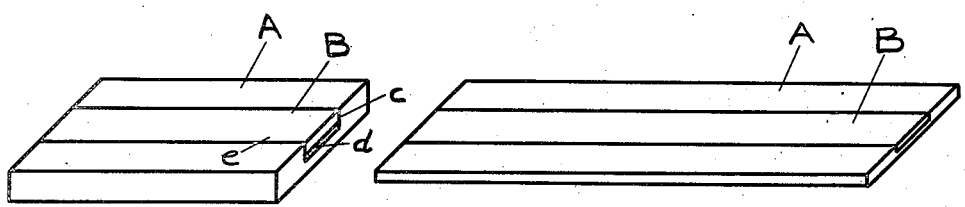
FIG. 1.  FIG. 2.
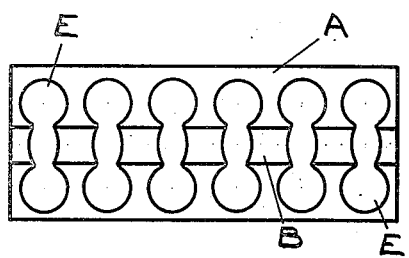  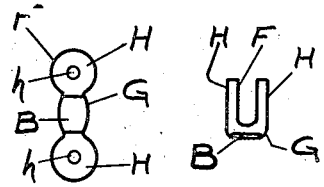
FIG. 3.  FIG. 4.  FIG. 5.
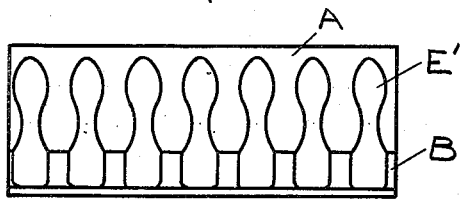  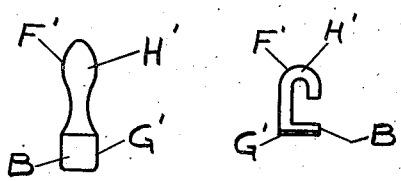
FIG. 6.  FIG. 7.  FIG. 8.
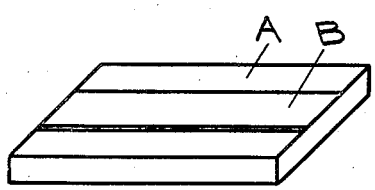  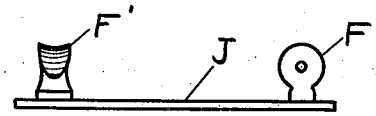
FIG. 9.  FIG. 10.
INVENTOR
Ashbel T. Wall
By Horatio E. Bellows
ATTORNEY

UNITED STATES PATENT OFFICE.

ASHBEL T. WALL, OF PROVIDENCE, RHODE ISLAND.

PIN COMPONENTS AND METHOD OF MAKING THE SAME.

1,378,501. Specification of Letters Patent. Patented May 17, 1921.

Application filed April 28, 1920. Serial No. 377,301.

*To all whom it may concern:*

Be it known that I, ASHBEL T. WALL, a citizen of the United States, residing at Providence, in the county of Providence and State of Rhode Island, have invented certain new and useful Improvements in Pin Components and Methods of Making the Same, of which the following is a specification.

My invention relates to components and especially to pin joints and catches, the same being known in this trade and in the art as "pin components." These components are articles of commerce purchased from the "component manufacturer" by the jewelry manufacturer who assembles the components together with a pin tongue and ornamental plate to form articles of jewelry, such as pins and brooches.

Heretofore pin components were constructed without means thereon for attachment thereof to the ornamental plate. The component was affixed to the plate by placing its base upon the ornamental plate, after proper fluxing of the parts, and next transferring with a brush the separate solder piece or pieces into contact with the parts and then fusing the parts together. The exceedingly small size of the components made this an expert performance. Furthermore the contact of the brush in applying the solder pieces repeatedly deranged the alinement of the component, and the boiling of the solder also dislocated it.

The essential objects of the present invention are to produce a component attachable to the plate without the application of pieces of solder in the assembling process, and to construct a component having such characteristics in a quick and inexpensive manner.

To the above ends essentially, but not exclusively, my invention consists in such parts and in such combintions of parts, and in such steps and in such combinations of steps, as fall within the scope of the appended claims.

In the accompanying drawings which form a part of this specification—

Figures 1 and 2 are perspective views of the original blank from which the components are formed, before and after rolling respectively.

Fig. 3, a plan of the latter after portions have been blanked therefrom.

Fig. 4, a complete blank of a component before bending,

Fig. 5, an end elevation of a complete component,

Fig. 6, a modified form of a rolled blank,

Figs. 7 and 8, modified forms of the parts shown in Figs. 4 and 5 respectively,

Fig. 9, a modified form of the parts shown in Fig. 1, and

Fig. 10, a side elevation of an ornamental plate with pin components mounted thereon.

Like reference characters indicate like parts throughout the views.

In carrying out my invention a plate A of German silver or other suitable material has plated or otherwise to its upper face a longitudinally disposed film or strip of solder represented in a general way by B. A preferred method of applying the solder film consists, as shown in Fig. 1, in producing by any suitable tool a transversely rectangular groove $c$ in which is placed a thin strip of soft or easily fusible solder $d$ superposed upon which is a strip $e$ of harder or less easily fusible solder, with its upper face flush with upper face of the plate A. The whole is then subjected to heat of a sufficient degree to fuse the strip $d$. It will be understood that the number of strips B may be increased to any desired extent parallel at intervals upon the plate. Another method of plating is to flush solder over the whole face of the plate A, and then plane off the solder from all the faces except the longitudinal area indicated as B in Fig. 9. It will be understood that in both Figs. 1 and 9 all the solder elements are of exaggerated thickness for the purposes of illustration.

Unless the plate A is initially very thin it is necessary to reduce the thickness thereof, preferably by passing the plate between heavy rolls, producing a blank or plate as shown in Fig. 2. An original elevation of the strip B above the plate A is made flush with the surface of the latter by the rolling operation.

By a series of cutting tools the blank A including its strip or film B is transversely cut to produce therefrom a series of oblong blanks. In Fig. 3 is shown the series of openings E in the plate A resulting from this cutting therefrom of the blanks F shown in detail in Fig. 4.

The blank F is the one from which the pin component is immediately formed. In this instance it comprises a portion G having upon its face the solder film B. It has also end portions H provided with open or closed cavities $h$. The portions H are bent upwardly from the base G to form ears, and the solder area B is upon the lower face of the base, all as shown in Fig. 5. This component is known as a pin joint.

In employing this process in the manufacture of a pin component known as a catch, the solder strip B is located comparatively near one edge of the plate A as shown in Fig. 6. Suitably shaped cutters applied transversely of the plate cut therefrom the blanks leaving the openings E' and producing blanks F'. Each of the latter comprises a portion G' having the solder surface B. It has a long end portion H'. The portion H' is upwardly bent from its base G' to form an ear having a downwardly bent end constituting a hook. The solder area is upon the lower face of the base. All as shown in Fig. 8.

It will be observed that the pin components F and F' have the solder strip, layer, or film incorporated into their bases and in such position are immediately available for application to an ornamental plate J by the purchasing manufacturer, who merely rests the components in their proper positions upon the plate J and then applies the flame to their respective bases to fuse the solder, without the necessity of the usual solder transfer and readjustments.

It will be understood that my process is not intended to be limited to the particular components enumerated, but with obvious adaptations may be employed in the construction of a large variety of articles.

I claim:—

1. In a component, the combination of a base, a strip of solder incorporated in the base, and an upturned ear upon the base.

2. The process of forming components consisting of plating a strip of solder upon a metal plate of less width than the plate, and cutting a blank from the plate transversely of the solder strip.

In testimony whereof I have affixed my signature.

ASHBEL T. WALL.